United States Patent [19]
Brooks

[11] 3,781,068
[45] Dec. 25, 1973

[54] BUSHING ASSEMBLY

[75] Inventor: Frank W. Brooks, Dayton, Ohio

[73] Assignee: General Motors Corporation, Detroit, Mich.

[22] Filed: Aug. 10, 1972

[21] Appl. No.: 279,485

[52] U.S. Cl............................. 308/4 R, 16/2, 85/80
[51] Int. Cl. ............................................ F16c 17/00
[58] Field of Search....................... 308/4 R, 15, 22, 308/26; 85/80; 287/93; 151/41.75; 16/2

[56] References Cited
UNITED STATES PATENTS
3,244,240  4/1966  Arthur................................ 308/3.5
2,255,971  9/1941  Hall................................ 308/237 R Primary Examiner—Manuel A. Antonakas
Assistant Examiner—R. H. Lazarus
Attorney—W. E. Finken et al.

[57] ABSTRACT

A bushing assembly installed in a sliding caliper, axially fixed rotatable disc, brake assembly in which the brake shoes transmit the brake torque to the caliper frame, which in turn transmits the brake torque to a fixed support member. The caliper assembly has a brake pad assembly including a brake shoe with ends extending laterally beyond the caliper frame and provided with a guide and support bushing assembly at each end, and a mounting plate operatively secured to the caliper frame. The mounting plate has laterally extending ends which each have a guide and support bushing assembly aligned with a similar arrangement in the noted brake shoe. Guide and support pins are fixed to the fixed support member and have portions extending through the bushing in the mounting plate and brake shoe ends so that the caliper is slidably supported and guided. Each bushing assembly includes an annular retainer having one end formed as an inwardly opening semi-torus and holding an elastomeric bushing engaging the associated pin in sliding relation, and the other end formed to lock the retainer in an aperture formed in the shoe or mounting plate end to which it is secured.

3 Claims, 5 Drawing Figures

PATENTED DEC 25 1973 3,781,068

BUSHING ASSEMBLY

The invention relates to a bushing assembly and more particularly to one which slidably guides a plate member, in which the bushing assembly is mounted, on a guide and support pin. In the disclosed utilization of the bushing assembly, a disc brake caliper assembly is slidably mounted on circumferentially spaced pins extending parallel to the axis of rotation of a rotatable disc and over the disc outer periphery. The caliper assembly has guide and support bushing assemblies embodying the invention fitting over the pins so that the caliper assembly is movable in axial directions relative to the disc axis to permit brake actuation and adjustment for lining wear. The fixed support bracket to which the pins are fixedly secured is arranged to take the brake torque from the caliper frame, the torque having been transmitted from the brake pad assemblies to the caliper frame for this purpose. One side of the caliper assembly is provided with a brake shoe assembly which also contains the guide and support bushing assemblies fitting the pins. The other side of the caliper assembly includes a mounting plate similarly arranged to contain bushing assemblies fitting the pins. The bushing assemblies provide an effective and inexpensive mounting arrangement for the caliper, are easily installed, and in one modification also easily removed, but only when the pin is first removed from the bushing assembly.

IN THE DRAWING

Figure 1:
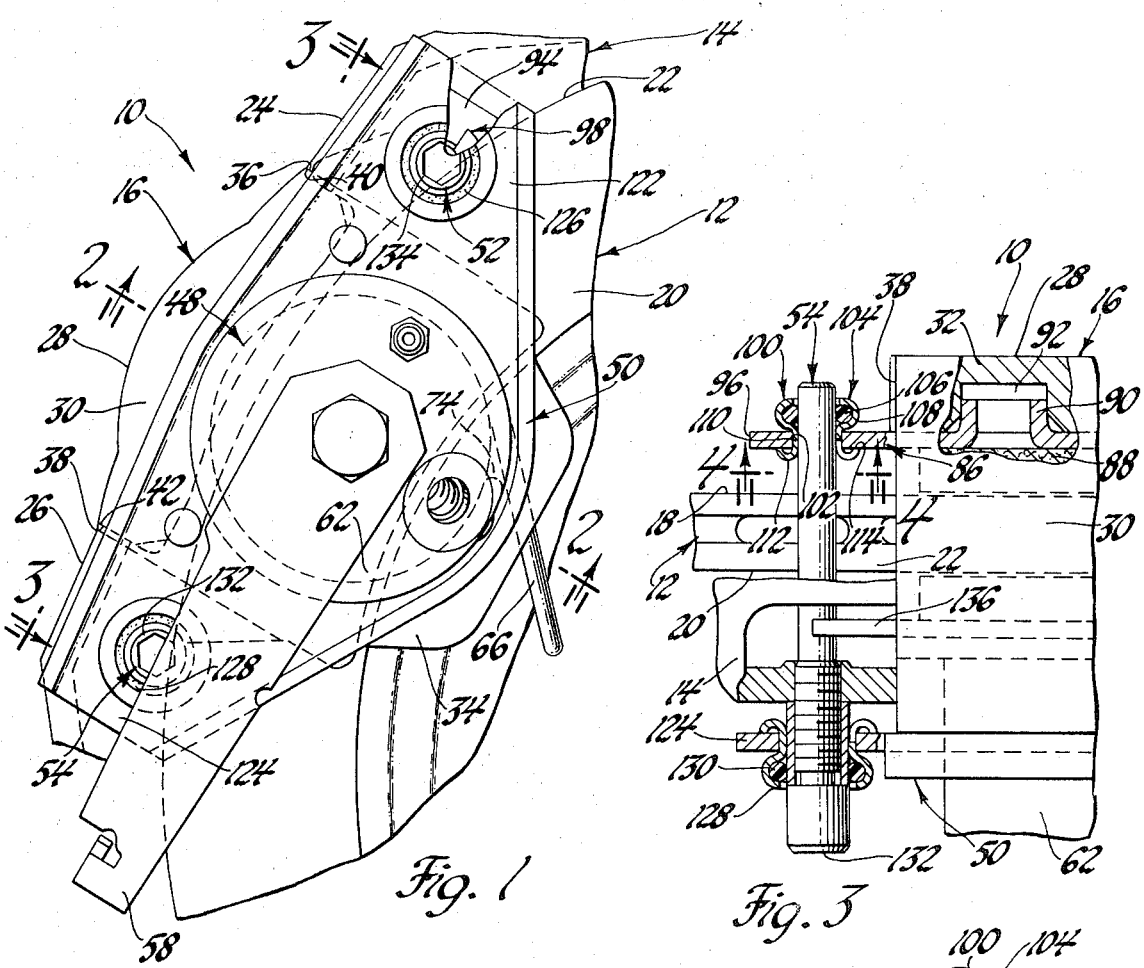
FIG. 1 is an elevation view, with parts broken away and in section, of a disc brake assembly having bushing assemblies embodying the invention.
Figure 2:
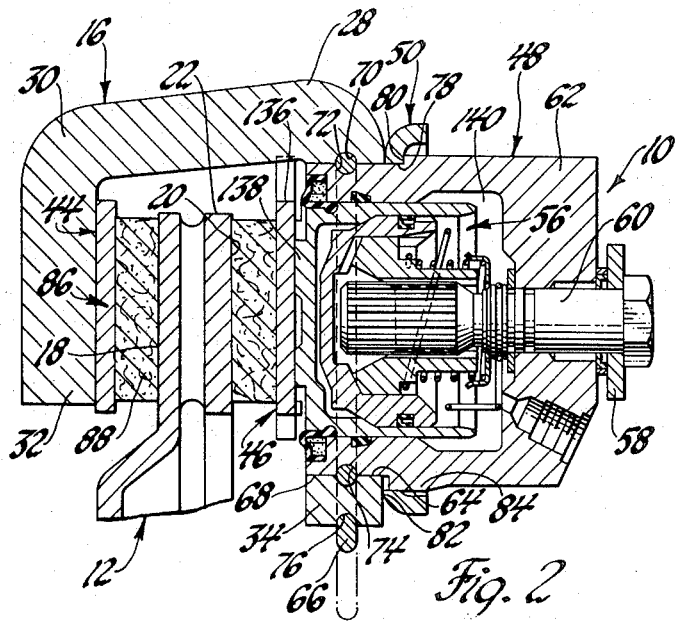
FIG. 2 is a cross-section view of the assembly of FIG. 1, taken in the direction of arrows 2—2 of that FIGURE.

The disc brake assembly 10 includes an axially fixed rotatable disc 12, a fixed support bracket 14, and a caliper assembly 16. The caliper assembly is of the sliding type. The fixed support bracket is adapted to be connected to a fixed portion of a vehicle, and the disc 12 is adapted to be rotated with a vehicle wheel, as is well known in the art. A general arrangement of this type is disclosed in U.S. Pat. No. 3,628,639, issued Dec. 21, 1971. The disc 12 has opposite friction surfaces 18 and 20 and an outer periphery 22. The fixed support bracket 14 is mounted on one side of the disc 10 and has torque-receiving flanges or arms 24 and 26 which extend over the outer periphery 22 of the disc.

The caliper assembly 16 has a caliper frame 28 comprised of a bridge section 30 extending over the disc outer periphery 22, an outboard leg 32 extending parallel to and axially spaced from the disc friction surface 18, and an inboard leg 34 extending generally parallel to and spaced from the disc friction surface 20. Thus, the caliper frame is generally U-shaped in cross section. The bridge section 30 is provided with edge surfaces 36 and 38 which are circumferentially spaced relative to the disc and are arranged to engage the end surfaces 40 and 42, respectively, of fixed support member arms 24 and 26 in torque-transmitting relation as well as being relatively slidable in directions parallel to the axis of the disc.

The caliper assembly also includes an outboard brake pad assembly 44, an inboard brake pad assembly 46, a cylinder and piston assembly 48, a mounting plate 50, and a caliper guide and support arrangement including guide and support pins 52 and 54. The cylinder and piston assembly 48 is provided with an adjuster mechanism 56 and a mechanical brake actuating construction including a parking brake lever 58 and pin 60. The parking brake actuating mechanism and the adjuster mechanism 56 are disclosed and described in detail in U.S. Pat. application Ser. No. 131,936, filed Apr. 7, 1971, entitled, "Disc Brake Caliper With Integral Parking Brake," now U.S. Pat. No. 3,688,875 and assigned to the common assignee. Other suitable adjusters and manually actuated arrangements may be utilized as desirable.

The cylinder and piston assembly 48 includes a cylinder body 62 which extends through an aperture 64 of caliper frame leg 34 and is secured in place in the aperture by a retainer 66. The inner wall of aperture 64 and the mating outer surface 68 of the cylinder body 62 are respectively provided with radially aligned grooves 70 and 72, which preferably extend circumferentially completely about the surfaces. The grooves cooperate to form an annular passage 74 which the wire-like retainer 66 fills. The caliper frame leg 34 has a similarly sized passage 76 which tangentially intersects passage 74 so that the retainer 66 can be inserted in place. The retainer arrangement is the subject of U.S. Pat. application Ser. No. 279,486, filed on even date herewith by me, entitled "Retainer Assembly," and assigned to the common assignee.

The mounting plate 50 has an aperture 78 thorugh which the cylinder body 62 is received, the cylinder body being provided with a shoulder 80 which engages one side of the mounting plate 50, the other side of the mounting plate engaging the outer surface 82 of caliper frame leg 34. A suitable offset or lug 84 formed on cylinder body 62 fits in a mating portion of mounting plate aperture 78 to prevent circumferential movement of the mounting plate relative to the cylinder body.

Figure 3:
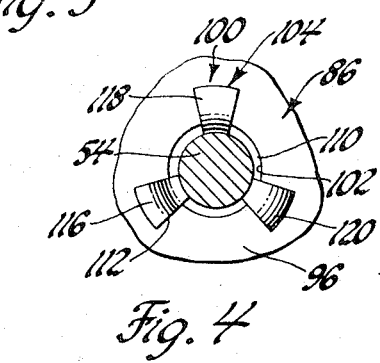
FIG. 3 is a fragmentary view, with parts broken away and in section, of the assembly of FIG. 1 taken in the direction of arrows 3—3 of that FIGURE.

The outboard pad assembly 44 includes a brake shoe 86 and brake lining friction material 88. As best seen in FIG. 3, shoe 86 has bosses 90, one such boss being shown in FIG. 3, which extend away from lining 88 and into recesses 92 formed in the caliper frame leg 32. Two such bosses and recesses are preferably provided so that they precisely locate the brake pad assembly in relation to the caliper frame and transmit brake torque from the pad assembly to the caliper frame.

The brake shoe 86 has laterally extending mounting ends 94 and 96 which extend circumferentially beyond the circumferentially spaced edges 36 and 38 of the caliper frame 28. The mounting ends are respectively provided with bushing assemblies 98 and 100. The mounting end 96 and bushing assembly 100 will be further described, it being understood that the mounting end 94 and bushing assembly 98 are similar. An aperture 102 is formed in mounting end 96. The bushing assembly 100 includes an annular bushing retainer 104 which extends through aperture 102, and an elastomeric bushing 106 which fits within an inwardly opening semi-torus 108 formed on one end of retainer 104.

The inner diameter of bushing 106 is smaller than the inner diameter of the retainer cylindrical center body section 110 and receives one end of pin 54 therethrough in sliding and resilient supporting relation. The other end of retainer 104 is formed as an axially opening semi-torus 112 which is open toward the one end. In the installed position the two semi-tori are on opposite sides of the shoe 86, and act to hold the assembly axially in place. Preferably the axial length of the center section 110 is related to the thickness of shoe 86 so that a spring-like retention of the assembly occurs, effectively preventing axial movement of the retainer 104 in aperture 102. The radially outer edge 114 of semi-torus 112 engages the side of shoe 86 for this purpose. Each semi-torus has all parts thereof at least as large in diameter as the inner diameter of the center body section 110.

Figure 4:
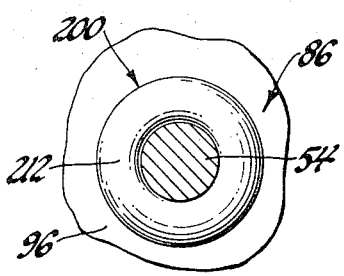
FIG. 4 is a fragmentary view, with parts broken away and in section, of one of the bushing assemblies embodying the invention, as installed, and taken in the direction of arrows 4—4 of FIG. 3.

As best seen in FIGS. 3 and 4, the retainer 104 in one embodiment has the end forming semi-torus 112 and at least a part of the center body section 110 formed to provide axially extending resilient fingers 116, 118 and 120 which are radially movable by bending to permit snap installation and removal of the bushing assembly in the aperture 102 when pin 54 is not present in the assembly. Of course, this arrangement presents the semi-torus 112 as a circumferentially interrupted semi-torus.

Figure 5:
FIG. 5 is a view similar to that of FIG. 4, and showing a modified bushing assembly embodying the invention.

In the modification of the retainer assembly 200 shown in FIG. 5, the cylindrical center section and semi-torus 212 are uninterrupted circumferentially. The retainer before installation has only the semi-torus 108 pre-formed, the portion of the retainer later becoming semi-torus 212 being an axial extension of the cylindrical center section so that the retainer is inserted through aperture 102 and the end opposite the elastomeric bushing-receiving semi-torus is suitably formed by spinning or by use of a shaped die to provide semi-torus 212. Some methods of forming this semi-torus may result in one or more circumferential interruptions, which will have no adverse effect on its function. In both modifications, the term semi-torus is to be construed to be sufficiently broad to include other related shapes and not be limited to precisely semi-circular cross section. For example, the semi-torus cross sections may be sections of ovals, ellipses, and other curvilinear configurations or with parts having flat portions, so long as there is an area for mounting an annular elastomeric bushing in one end and a retaining end of similar axially opening conformation on the other end.

The mounting plate 50 also has laterally extending mounting ends 122 and 124 which are located on the other side of the disc 10 from the brake shoe mounting ends 94 and 96. The mounting plate mounting ends are provided with bushing assemblies 126 and 128, respectively, which are constructed in the same manner as bushing assembly 100 and need not be further described. The elastomeric bushing 130 of bushing assembly 128 receives the nut 132 of pin 54 in sliding and resilient supporting relation. The bushing assemblies 98 and 126 similarly respectively receive pin 52 and its nut 134. The pins 52 and 54 are fixed to support bracket 14 by suitable means, such as the thread and nut arrangement shown in FIG. 3, so that the pins extend axially parallel to the disc 10 and over the disc outer periphery 22. The pins thereby support the caliper assembly 16 and guide it in its sliding movements occurring during brake actuation and lining wear.

The inboard shoe 136 of brake pad assembly 46 is operatively engaged by the piston 138 on the side opposite its friction surface 20 so that when the pressure chamber 140, defined by cylinder body 62 and piston 138, is pressurized, piston 138 forces the brake pad assembly 46 into frictional engagement with the disc friction surface 20. The pressure reaction in chamber 140 forces cylinder body 62 and caliper frame 28 in the opposite direction, thereby moving the brake lining 88 of the outboard brake pad assembly 44 into frictional engagement with the disc friction surface 18. Any necessary sliding movement of the caliper assembly to accomplish this brake actuation is accomplished by movement of the caliper as provided for by the bushing assemblies. As the brake linings wear, this axial sliding movement permits maintenance of brake adjustment. The adjuster mechanism 56 will operate to prevent an undesirable amount of retraction of piston 138 upon brake release, thereby maintaining brake adjustment. If the brake is manually actuated by rotation of parking brake lever 58, piston 138 is moved forwardly and the caliper frame is oppositely moved to engage the brake linings with their respective disc friction surfaces in braking relation. When the lever 58 is rotated to release, the brake is released.

Bushing assemblies embodying the invention may be used effectively in other mechanisms than disc brake mounts. They provide effective, easily installed, inexpensive and reliable means for resilient guide and support relative to a pin or rod, particularly in applications where the bushing assemblies are to be on plates.

What is claimed is:

1. A bushing assembly adapted to be removably installed in an aperture in a plate and to slidably guide a pin extending through the plate, said bushing assembly comprising:

an annular retainer having a cylindrical center body section with one end formed as an inwardly opening semi-torus and the other end formed as an axially opening semi-torus open toward said one end, each semi-torus having all parts thereof at least as large in diameter as the inner diameter of said center body section;

and an annular elastomeric bushing having an inner diameter less than the inner body diameter of said center body section and received in said inwardly opening semi-torus and adapted to slidably engage the pin extending therethrough;

said axially opening semi-torus end being adapted to engage one side of the apertured plate and the outer surface of said inwardly opening semi-torus being adapted to engage the other side of the apertured plate and retain said assembly in the plate aperture.

2. The bushing assembly of claim 1,
    said other end and at least a part of said center body section being formed to provide axially extending resilient fingers which are radially movable by bending to permit snap installation and removal of said bushing assembly in the plate aperture in the absence of the pin.

3. The bushing assembly of claim 1,
    said other end being formed to provide the axially opening semi-torus as a circumferentially uninterrupted semi-torus.

* * * * *